United States Patent [19]

Hamano et al.

[11] 4,213,179
[45] Jul. 15, 1980

[54] DATA PROCESSING APPARATUS FOR ELECTRONIC CASHIER REGISTERS

[75] Inventors: Koichi Hamano; Takao Morimoto; Junko Watanabe; Kaoru Ono; Norio Yagi, all of Shizuoka, Japan

[73] Assignee: Tokyo Electric Co., Ltd., Tokyo, Japan

[21] Appl. No.: 944,591

[22] Filed: Sep. 21, 1978

[30] Foreign Application Priority Data

Oct. 8, 1977 [JP] Japan .................................. 52-121101
Oct. 8, 1977 [JP] Japan .................................. 52-121104

[51] Int. Cl.² .......................... G06F 15/02; G06F 15/20
[52] U.S. Cl. ....................................... 364/405; 364/900
[58] Field of Search ................ 364/405, 404, 200, 900

[56] References Cited

U.S. PATENT DOCUMENTS

| 3,859,635 | 1/1975 | Watson et al. ........................ 364/200 |
| 3,946,220 | 3/1976 | Brobeck et al. ...................... 364/405 |
| 3,983,577 | 9/1976 | Youichi Ito et al. ................. 364/900 |

FOREIGN PATENT DOCUMENTS

| 50-156832 | 12/1975 | Japan ........................................ 364/709 |
| 51-98924 | 8/1976 | Japan ........................................ 364/709 |

*Primary Examiner*—David H. Malzahn
*Attorney, Agent, or Firm*—Frishauf, Holtz, Goodman & Woodward

[57] ABSTRACT

A data processing apparatus for an electronic cash register comprises a keyboard having a plurality of entry keys, a printer, a memory unit, an interface circuit with which a memory pack storing sales data is mechanically, electrically and removably coupled and a data processing unit connected with the keyboard, the printer, the memory unit and the interface circuit. Responding to operations of one of the keys for sales data selection, the data processing unit energizes the memory pack connected to the interface circuit to read out the sales data corresponding to the operated sales information key from the energized memory pack and write the read-out sales data into the memory unit and then issue a print signal to the printer for printing the sales data.

6 Claims, 31 Drawing Figures

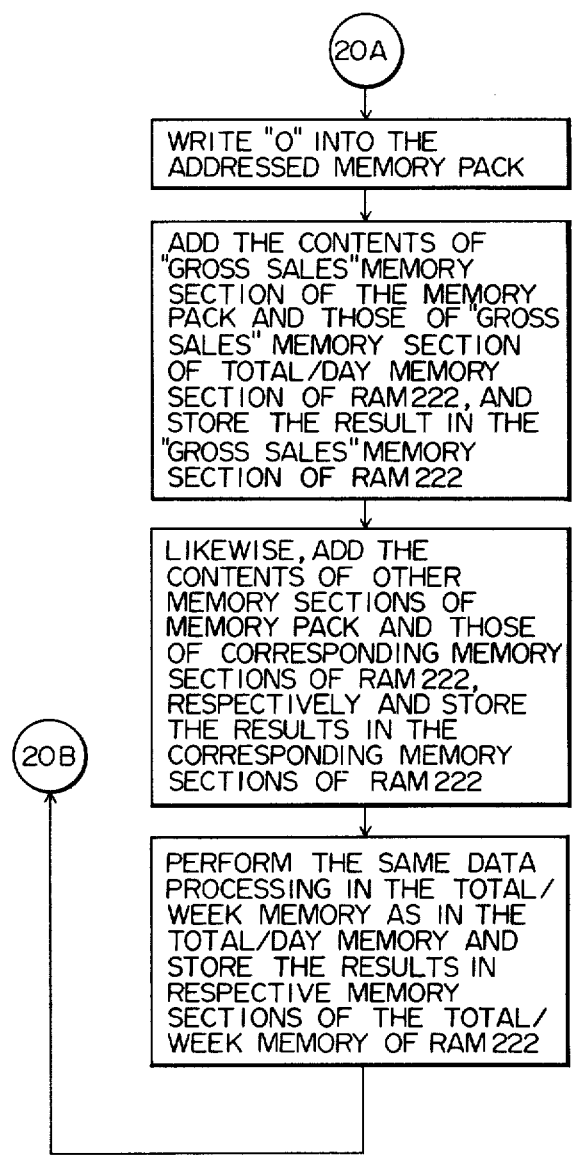

FIG. 21

MEMORY AREA FOR REPORT TABLE

| COUNT MEMORY | TOTAL SALES AMOUNT/DAY MEMORY | TOTAL SALES AMOUNT/WEEK MEMORY | |
|---|---|---|---|
| 0 (CUST) | GROSS SALES | GROSS SALES | |
| 1 (RTNC) | RTN | RTN | |
| 2 (VOIDC) | VOID | VOID | |
| 3 (CPN2C) | CPN2 | CPN2 | |
| 4 (BTLC) | BTL | BTL | |
| 5 (ITEM) | NET SALES | NET SALES | |
| 6 (—) | TAX TL | TAX TL | |
| 7 (—) | NS W/O TAX | NS W/O TAX | |
| 8 (DBC) | DUE BILL | DUE BILL | TOTALIZER FOR EACH TRANSACTION |
| 9 (—) | CASH TOTAL | CASH TOTAL | |
| 10 (CHECKC) | CHECK TOTAL | CHECK TOTAL | |
| 11 (MSC) | MISC TOTAL | MISC TOTAL | |
| 12 (—) | FOOD STAMP TOTAL | FOOD STAMP TOTAL | |
| 13 (CPN1C) | COUPON1 TOTAL | COUPON1 TOTAL | |
| 14 (—) | TXBL TOTAL | TXBL TOTAL | |
| 15 (NEGC) | NEG TOTAL | NEG TOTAL | |
| 16 (CVDC) | CVD TOTAL | CVD TOTAL | |
| 17 (—) | GT | GT | |
| 18 (HR0C) | HR0 | HR0 | |
| 19 (HR1C) | HR1 | HR1 | TOTALIZER FOR EVERY HOUR |
| ⋮ | ⋮ | ⋮ | |
| 40 (HR22C) | HR22 | HR22 | |
| 41 (HR23C) | HR23 | HR23 | |
| 42 (DP1C) | DP1 | DP1 | TOTALIZER FOR EACH DEPARTMENT |
| ⋮ | ⋮ | ⋮ | |
| 51 (DP10C) | DP10 | DP10 | |

FIG. 22

```
STORE SALES REPORT

CLOSING  GT              8235478
OPENING  GT              8194606

GROSS SALES                40872
RETURN MDS       2           107
VOID             1            50
COUPON  2        5           234
BOTTLE RETURN    1            10

NET SALES                  40469

TAX                         3852
NET SALES W/O TAX          36617

DB ISSUED        1            48

TOTAL TO ACC. FOR          40517

CASH TOTAL                 31036
CHECK TOTAL      5          8050
MISC TOTAL       1           532
FOOD STAMP                   840
COUPON 1         2            59

TENDER TO ACC. FOR         40517

CASH                         100
FOOD STAMP                     0

TOTAL LOAN                   100

CASH TOTAL                 31136
CHECK TOTAL                 8050
MISC TOTAL                   532
FOOD STAMP                   800
DB REDEEMED                   30
COUPON 1                      59

END OF REPORT
```

F I G. 24

```
STORE  NO 123  DATE    01/03/77

CASHIER  TRANSACTION  REPORT

END OF DAY                17 : 49
CASHIER  NO 0567

GROSS  SALES              13240
ITEM  SOLD        10
CUSTOMER          5

CASH  TOTAL               13240
CHECK  TOTAL      0           0
MISC  TOTAL       0           0
FOOD  STAMP                   0

NET  TO  ACC. FOR         13240

DB  ISSUED        0           0

BALANCE  TO  ACC. FOR     13240

BOTTLE  RETURN    0           0
COUPON  1         0           0
COUPON  2         0           0

NET  SALES                13240

TAX                           0

RETURN  MDS       0           0
VOID              0           0

TAXABLE  TOTAL                0
NEGATIVE  TOTAL               0

END  OF  REPORT
```

DATA PROCESSING APPARATUS FOR ELECTRONIC CASHIER REGISTERS

Background of the Invention

The present invention relates to a data processing apparatus for electronic cash registers.

Electronic cash registers (ECR) have predominantly been used in recent supermarkets and department stores. In this type of cash register, when tabulating sales tables of various types, one cannot selectively take out desired sales data alone but must take them out together with ones which are now not required.

Summary of the Invention

Accordingly, an object of the invention is to provide a data processing apparatus for an electronic cash register which can selectively tabulate various sales information.

According to the invention, there is provided a data processing apparatus for electronic cash registers comprising: a keyboard having a plurality of entry keys, printing means, memory means, an interface circuit with which a memory pack for storing sales data is mechanically, electrically and removably coupled and a data processing unit connected with the keyboard, the printing means and the interface circuit, and responding to operations of one of the keys for sales data selection to energize the memory pack connected to the interface circuit to read out the sales data corresponding to the sales information key operated from the energized memory pack and write the read out sales data into the memory unit and then issue a print signal to the printer for printing the sales data.

Other objects and features of the invention will be apparent from the following description taken in connection with the accompanying drawings.

Brief Description of the Drawings

FIGS. 20A-20C show a flow chart to illustrate a process for making out a store sales report;

FIG. 21 illustrates a memory allotment used when the store sales report is prepared in FIG. 20;

FIG. 22 shows one of the store sales reports prepared in accordance with the process for store sales report shown in FIG. 20;

FIG. 24 shows one of the cashier sales reports in accordance with the cashier sales report preparing process shown in FIG. 23;

FIG. 26 shows the changed contents of the information printed in accordance with the procedure of changing the item code information shown in FIG. 25.

Description of the Preferred Embodiments

Figure 1:
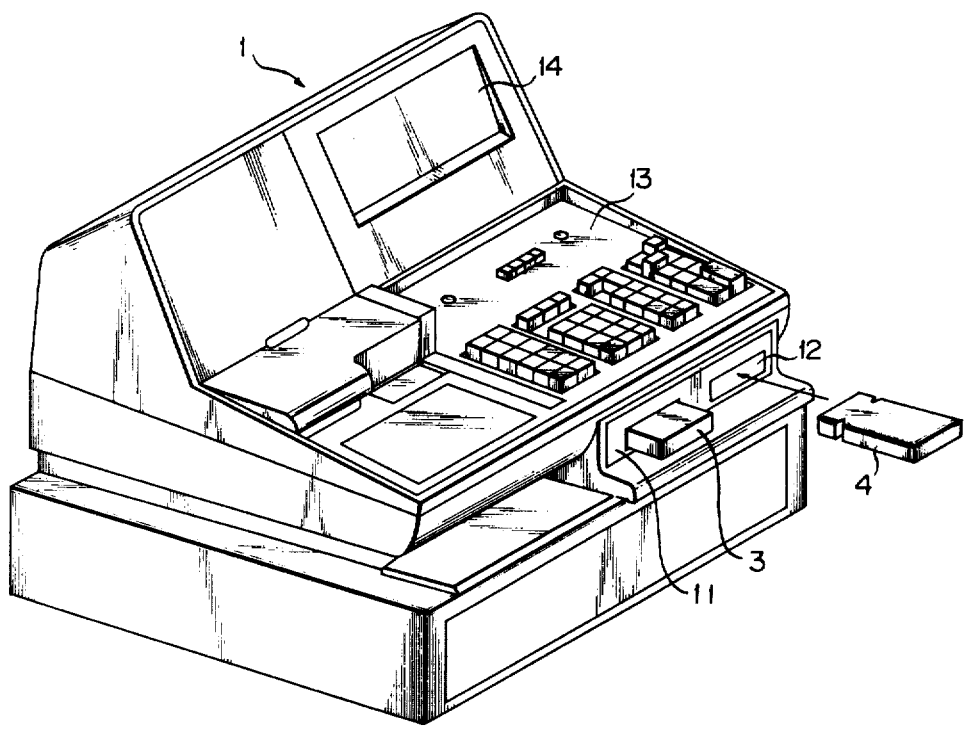
FIG. 1 shows a perspective view of an electronic cash register.
Figure 2:
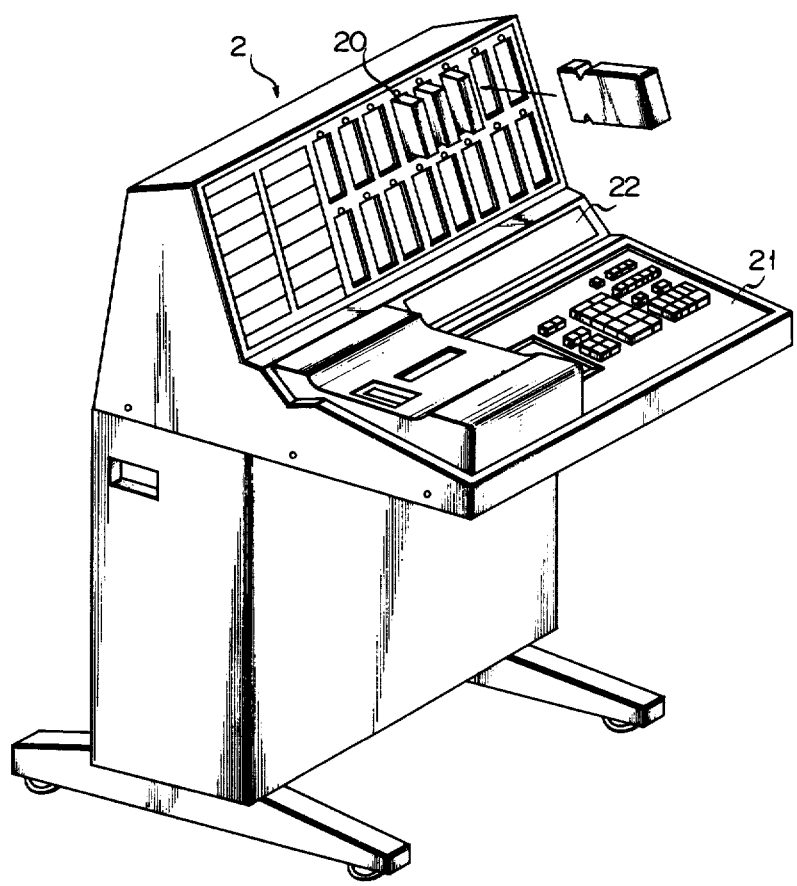
FIG. 2 shows a store data processing apparatus according to one embodiment of the invention, which is used in combination with the electronic cash register shown in FIG. 1.

Referring now to FIG. 1, there is shown the external appearance of an electronic cash register, and FIG. 2 shows a store data processing apparatus which is an embodiment according to the invention. The embodiment uses two kinds of memory packs; a memory pack for terminal 3 and a memory pack for cashier 4.

First, a given number of terminal memory packs 3 are inserted into receptacles in the memory pack receiving section 20 of the store data register (SDP) 2. Then, through proper key operations on the keyboard 21, specific terminal code numbers are entered into the terminal memory packs 3 and common data such as a tax table and price looking-up (PLU) data, are successively loaded into these memory packs 3. In other words, at least part of information to be stored in a random access memory (RAM) of a conventional cash register is loaded into the terminal memory pack 3. Next, the cashier memory packs 4 are loaded into the corresponding memory pack receiving section 20 of the SDP 2. Then, through various key operations on the keyboard 21, a cashier code, data and the like are entered into the cashier memory pack 4. The memory packs 3 and 4 stored with the given information are loaded into receptacles 11 and 12 of the cash register 1. After the proper insertion of the memory packs, an operator, or a cashier can properly operate keys on the keyboard 13 to execute necessary operations such as registration into the cash register 1, as in the case of the ordinary cash register. The registration data are stored in both the memory packs 3 and 4.

In the course of a days work, when a cashier being engaged in operating a first cash register is ordered to operate a second cash register, she has only to insert her cashier memory pack 4 into the receptacle 12 of the second cash register. In this case, registration data resulting from her registration operation in the second cash register is written into her cashier memory pack 4, following the registration data which have been recorded by the registering operation in the first cash register. Written into the terminal memory pack 3 of the second cash register is the data resulting from the registering work executed in the second cash register irrespective of the cashier. In this manner, the terminal memory pack 3 records the registration data of a specified cash register and the cashier memory pack 4 records the registration data by a specified cashier. Cash trays are provided for respective cashiers in practical use and are removable from the cash register. That is, the cash tray can be carried by a specified cashier who is ordered to change cash register to operate. Accordingly, the registration data recorded in the cashier memory pack must be coincident with items and amount of cash, credit cards and the like accommodated in the cash tray exclusively used in the transaction of her work. In the verification, if both are not coincident with each other, this indicates that the cashier had made a registering error or something of the sort. Such a verification is performed at the end of a days work, for example.

The memory packs 3 and 4 storing the registration data thus collected are removed from the individual cash registers 1 at the end of the work of a day and loaded into the SDP 2. The registration data of all the terminal memory packs 3 of given number are all collected to obtain the store sales total in the day, i.e. the net total of all the cash registers in the store. Further, the registration data of all the cashier memory packs are totalized to obtain the sales total of each cashier and the net total of all the cashiers, i.e. the sales total of the store in the day. The sales totals thus calculated from the memory packs 3 and 4 may be compared with each other to check the reliability of the sales data collected.

The construction of the SDP 2 follows.

Figure 3:
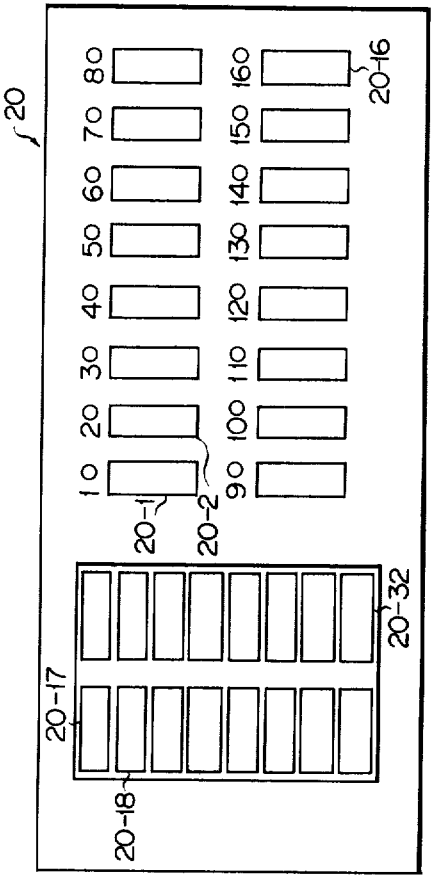
FIGS. 3 to 5 show the front views of the receptacle for memory packs, display and keyboard of the store data processing apparatus shown in FIG. 2.

FIG. 3 shows a memory pack receiving section 20 of the SDP 2. For writing and reading data into and from memory packs, the memory packs are loaded into sixteen receptacles 20-1 to 20-16 for memory packs arranged in two rows. The metal plate is used for preventing dust from getting into the receptacle. Each receptacle is provided with the numeral representing the receptacle number and a display lamp for indicating that reading and writing operations are now performed from and into the memory pack. Receptacles 20-17 to 20-32 for keeping memory packs not used are additionally provided adjacent the receptacles 20-1 to 20-16.

Figure 4:
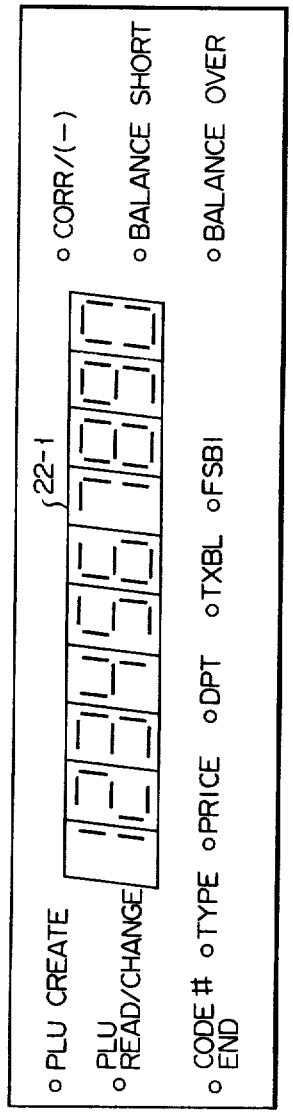

FIG. 4 shows a display section 22 of the SDP 2. In this example, a display unit to ten digits 22-1 is used in which the upper four digits are used to display the code number of a cashier and the number of a memory pack and the lower six digits, to display the amount information.

The display unit 22 in practical use is provided with various display lamps for indicating various operation modes. However, these are not essential to the invention, thus omitting them in the drawing.

Figure 5:
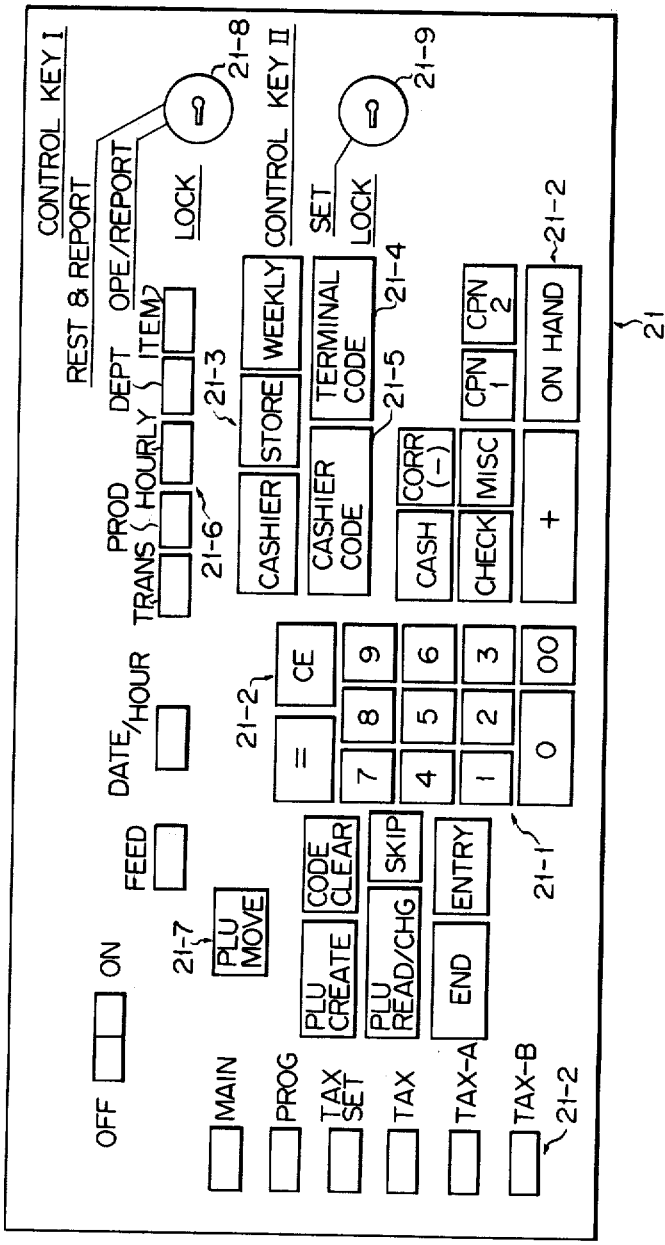

FIG. 5 shows a keyboard 21 of the SDP 2. In the keyboard 21, there are provided eleven entry keys 21-1 for indicating numerals "00", "0" to "9", registration keys 21-2 for registering the information relating to receipts and payments of money, sales report keys 21-3 for preparing cashier, store and weekly sales reports, a terminal code key 21-4 for registering the terminal code number of the electronic cash register (ECR), a cashier code key 21-5 for registering the code number of a cashier, sales information selection keys 21-6 for preparing tables about the transaction information, production rate information, sales information per hour, sales information for each department, and sales information for each item code, a PLU key 21-7 for executing the price code information change (PLU), and control keys 21-8 and 21-9 for setting operational modes. When the sales information selection key is once depressed, it is held at the depressed position until it is again depressed to be released.

Figure 6:
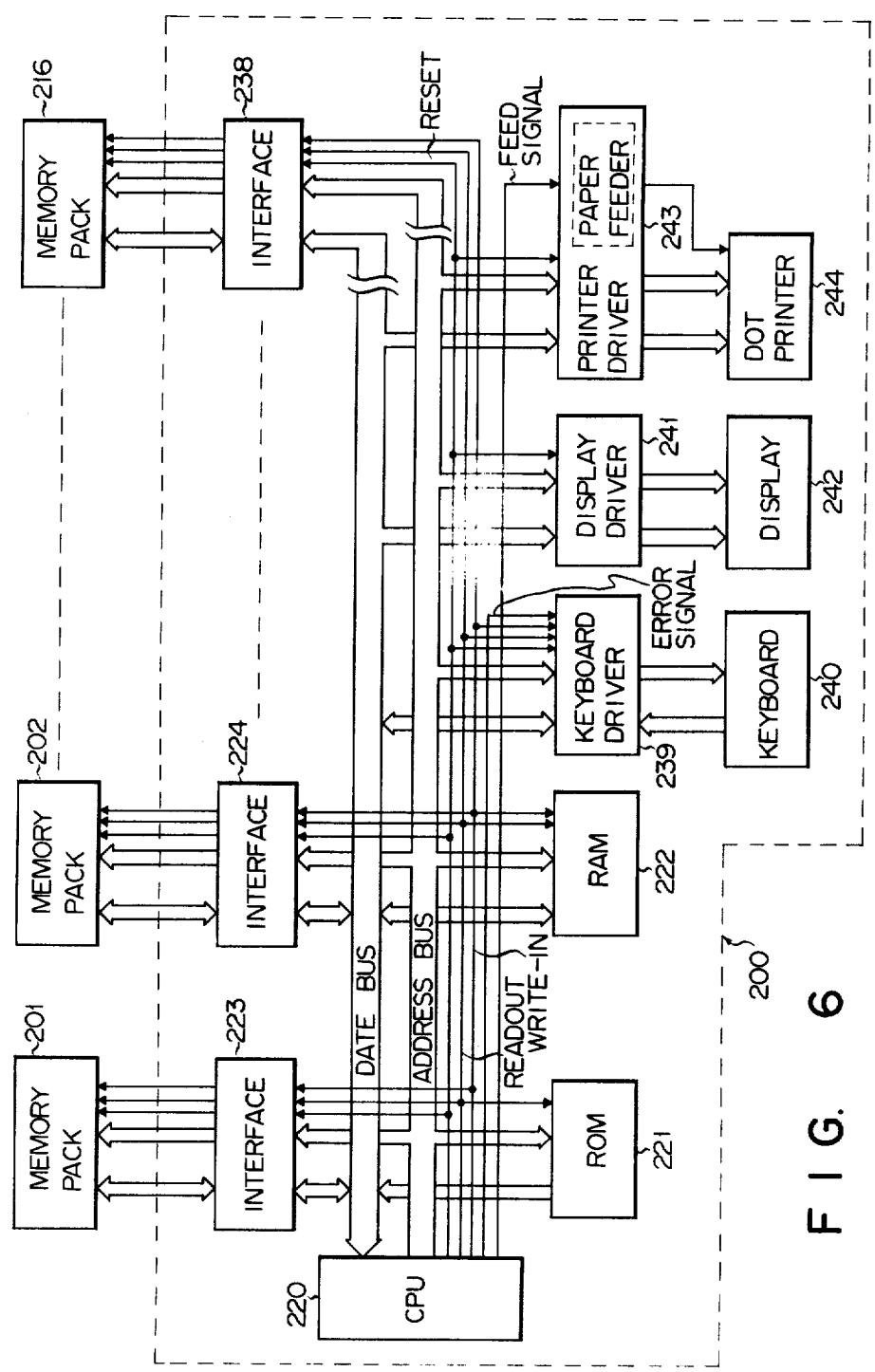
FIG. 6 shows a circuit diagram of the store data processing apparatus shown in FIG. 2.

FIG. 6 shows an electronic circuit section 200 of the SDP 2, and sixteen memory packs 201 to 216 coupled with an electronic circuit section 200. The electronic circuit 200 is comprised of a central processing unit (CPU) 220, a read only memory (ROM) 221, a random access memory (RAM) 222, and sixteen memory pack interfaces 223 to 238 for electrically coupling the CPU 220 with memory packs 201 to 216. These interfaces will subsequently be described later. The CPU 220 is coupled with a keyboard circuit 240 via a keyboard drive circuit 239 to be described later in detail. The same is connected to a display circuit 242 via a display drive circuit 241, and to a dot printer 244 via a printer driver 243.

Figure 7:
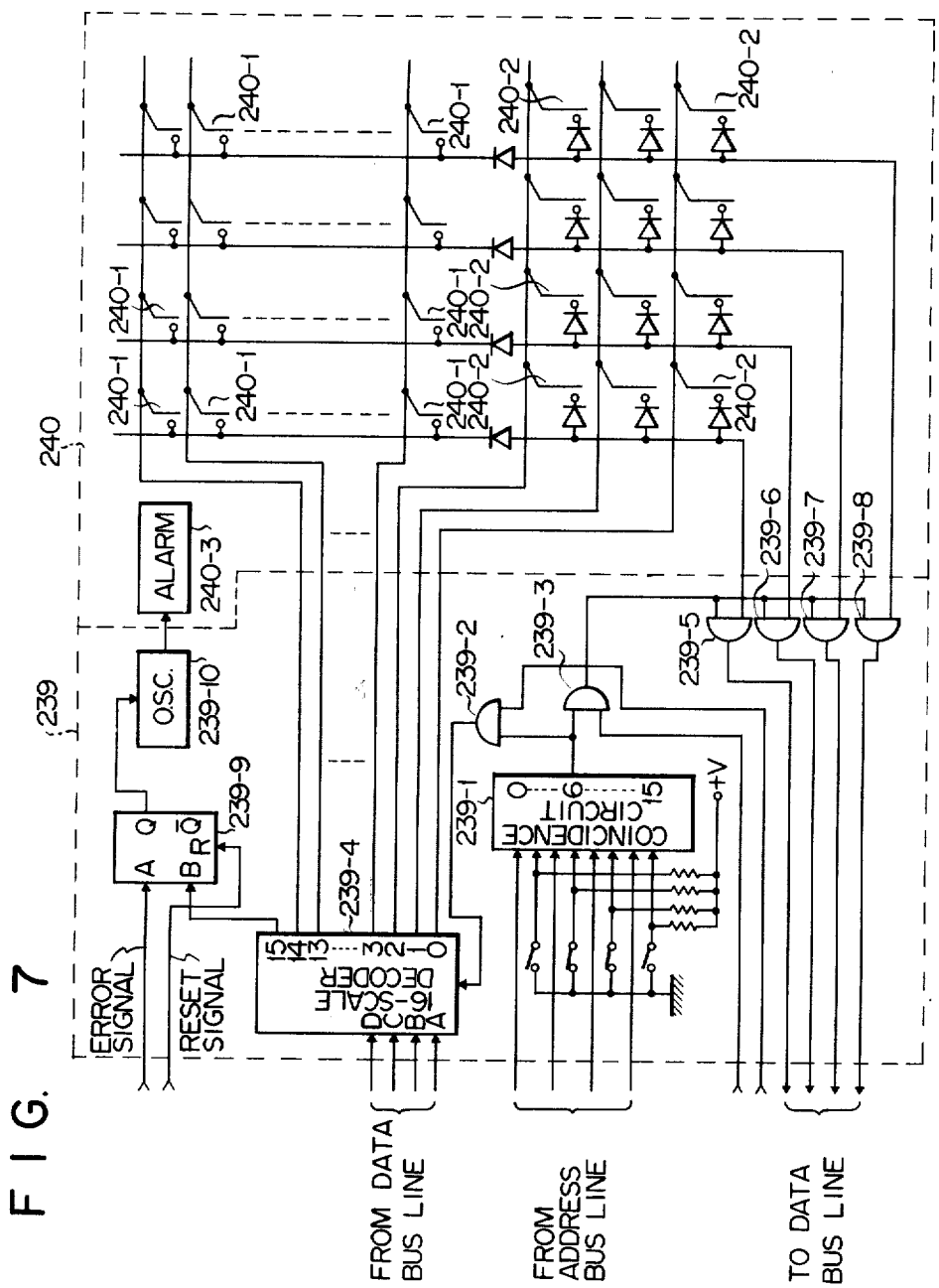
FIG. 7 shows a circuit diagram including a keyboard drive circuit and keyboard circuit shown in FIG. 6.

FIG. 7 illustrates the details of the keyboard drive circuit 239 and the keyboard circuit 240. When an address signal "0110", for example, is delivered through an address bus line from the CPU 220, an address coincidence circuit 239-1 of the keyboard drive circuit 239 detects that the keyboard drive circuit 239 is selected. Upon the detection, the coincidence detection circuit 239-1 supplies an output signal from an output terminal "6" to AND gates 239-2 and 239-3. As a result, a write signal delivered through a write line from the CPU 220 is applied to a scale-of-16 decoder 239-4 thereby to set the decoder 239-4 to be operative. Thus conditioned decoder 239-4 responds to a data signal delivered through a data bus line from the CPU 220 to sequentially and repetitively produce at the output terminals "0" to "15" output pulses to keys 240-1 and 240-2 arranged in a key matrix of the keyboard circuit 240. The respective keys of the key matrix correspond to those shown in FIG. 5. The output signals of the key matrix are transferred through four AND gates 239-5 to 239-8 and bus lines to the CPU 220. The AND gates 239-5 to 239-8 are energized by a read signal delivered through the read line and the AND gate 239-3 from the CPU 220. In this manner, the CPU 220 detects what key is operated on the keyboard 21.

When a key is erroneously depressed, an error signal generated from the CPU 220 is applied to the input terminal A of a bistable multivibrator 239-9 via an error signal line. Upon the application of the signal, the multivibrator 239-9 produces at the output terminal Q a high level signal to be directed to an oscillator 239-10. The high level signal drives the oscillator to start its oscillation. The output signal from the oscillator 239-10 drives an alarm 240-3 to give an alarm. The multivibrator 239-9, after the error is removed, is switched in its state by an output pulse generated from the output terminal "15" of the decoder 239-4 and produces at the output terminal Q a low level signal to stop the operation of the oscillator 239-10.

Figure 8:
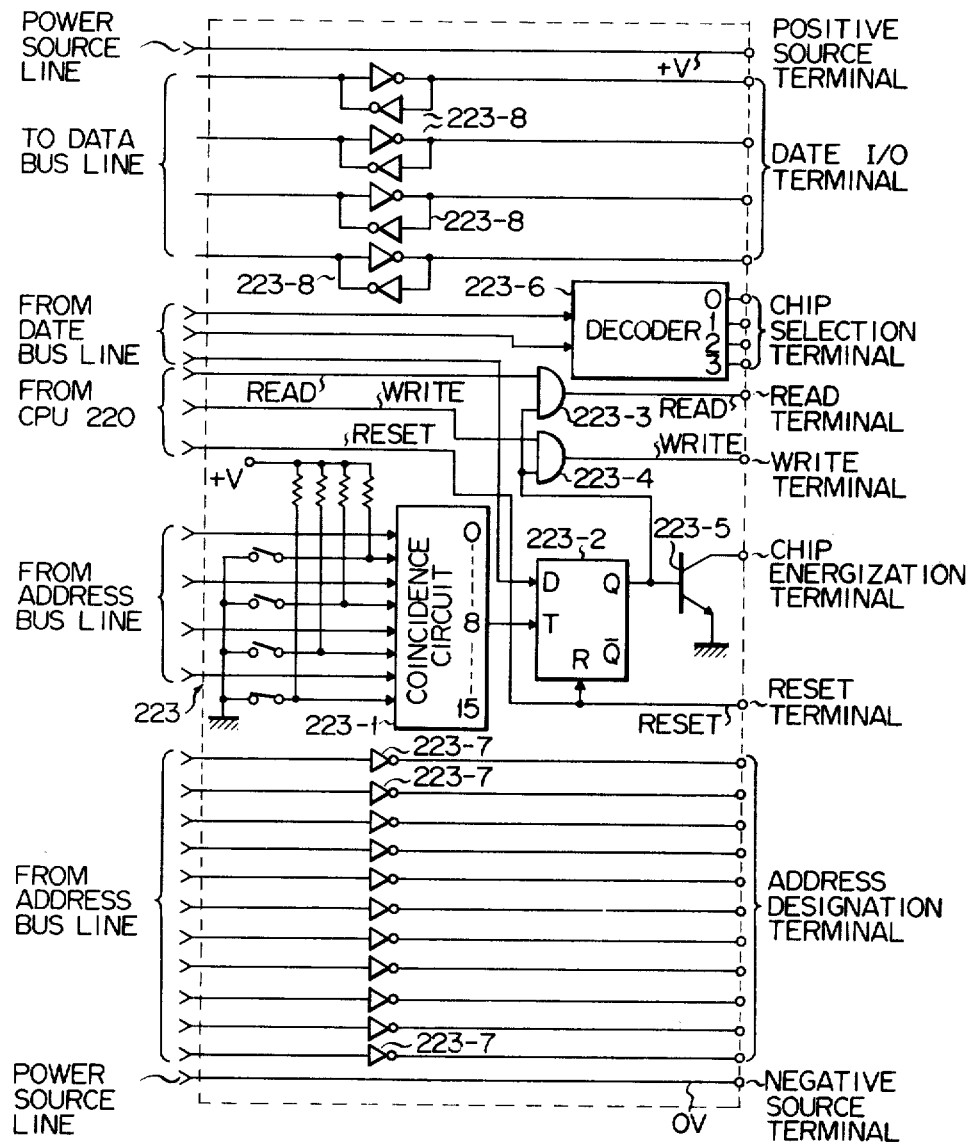
FIG. 8 shows a circuit diagram of the interface circuit shown in FIG. 6.

FIG. 8 shows the detail of the memory pack interface 223 shown in FIG. 6. The remaining interfaces 224 to 228 each have the same construction as that of the interface 223 except that the address coincidence circuits 223-1 have their own codes.

The coincidence detection circuit 223-1 of the interface 223, as in the coincidence detection circuit 239 shown in FIG. 7, delivers an output signal at the output terminal "8", for example, to the input terminal T of the flip-flop circuit 223-2, when an address signal corresponding to a specified code formed by a plurality of switches is delivered thereto from the CPU 220. Under this condition, when the CPU 220 supplies a signal to the input terminal D of the flip-flop circuit 223-2 through the data bus line, the flip-flop circuit 223-2 supplies an output signal to the AND gates 223-3 and 223-4, thereby to enable the AND gates and at the same time render the transistors 223-5 conductive. Accordingly, the read and write signals delivered through the read line and write lines are permitted to pass through the respective AND gates 223-3 and 223-4. The reset terminal R of the flip-flop 223-2 is connected to the reset line coming from the CPU 220.

Responsive to the information signal delivered through the date bus line from the CPU 220, the decoder 223-6 produces an output signal at output terminal "0" "1", "2" or "3" to select a memory chip of the memory pack coupled with the interface 223. The addressing of the memory pack is performed through a plurality of addressing lines including inverters 223-7 with buffer functions and data transfer between the memory pack and CPU 220 is effected through a plurality of data lines including inverters 223-8 with bidirectional buffer functions.

Figure 9:
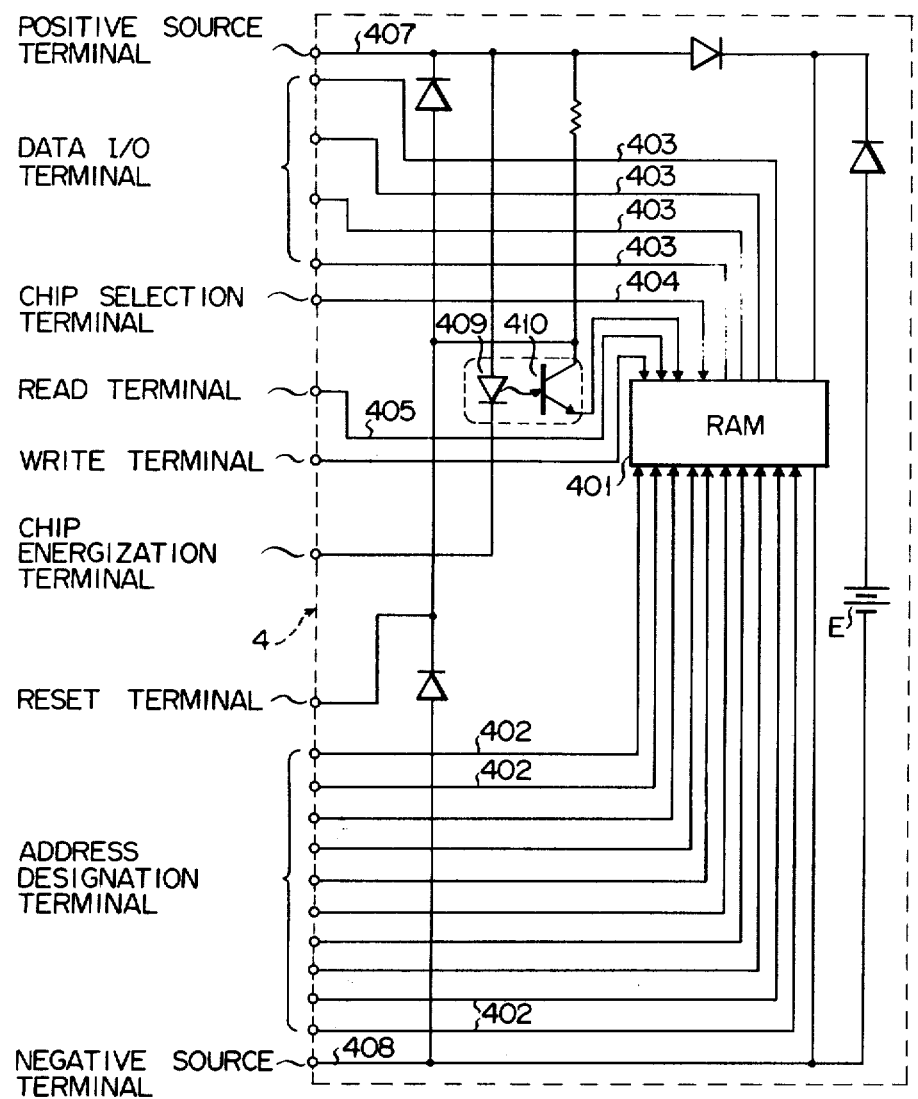
FIGS. 9 and 10 show a circuit diagram of a cashier memory pack and a terminal memory pack shown in FIG. 6.

FIG. 9 shows a circuit diagram of a cashier memory pack 4. The memory pack 4 is inserted into the memory pack receiving section 20 of the SDP 2, so that the memory pack 4 circuit is coupled with the interface 223 shown in FIG. 8. More particularly, a plurality of addressing lines 402 for addressing the random access memory (RAM) 401 are coupled with addressing lines with inverters 223-7. A plurality of data lines 403 for the RAM 401 are coupled with data lines including inverters 223-8. A selection line 404 for selecting the RAM 401 is coupled with the output terminal "0" of the decoder 223-6, and the read line 405 and the write line 406 for the RAM 401 are coupled with the AND gates 223-2 and 223-4, respectively.

When the memory pack 4 is coupled with the interface 223, reading and writing of data from and to the RAM 401 are performed by an external power supply (not shown) through power source lines 407 and 408 of the memory pack 4 and a power source line of the interface 223. When the memory pack 4 is removed from the interface 223, the contents stored in the RAM 401 is held by an internal power source E.

In order to energize the RAM 401, this example uses a combination circuit of a photodiode 409 and a phototransistor 410. When the memory pack 4 is coupled with the interface 223 and an output Q of the flip-flop 223-2 renders the transistor 223-5 conductive, current flows through the collector-emitter path of the transistor 223-5 and the photodiode 409. The photodiode 409, responsive to this current, emits light, and the phototransistor 410 conducts, with the result that an energizing signal from the external power source is applied to the RAM 401 through the collector-emitter path of the phototransistor 410.

Figure 10:
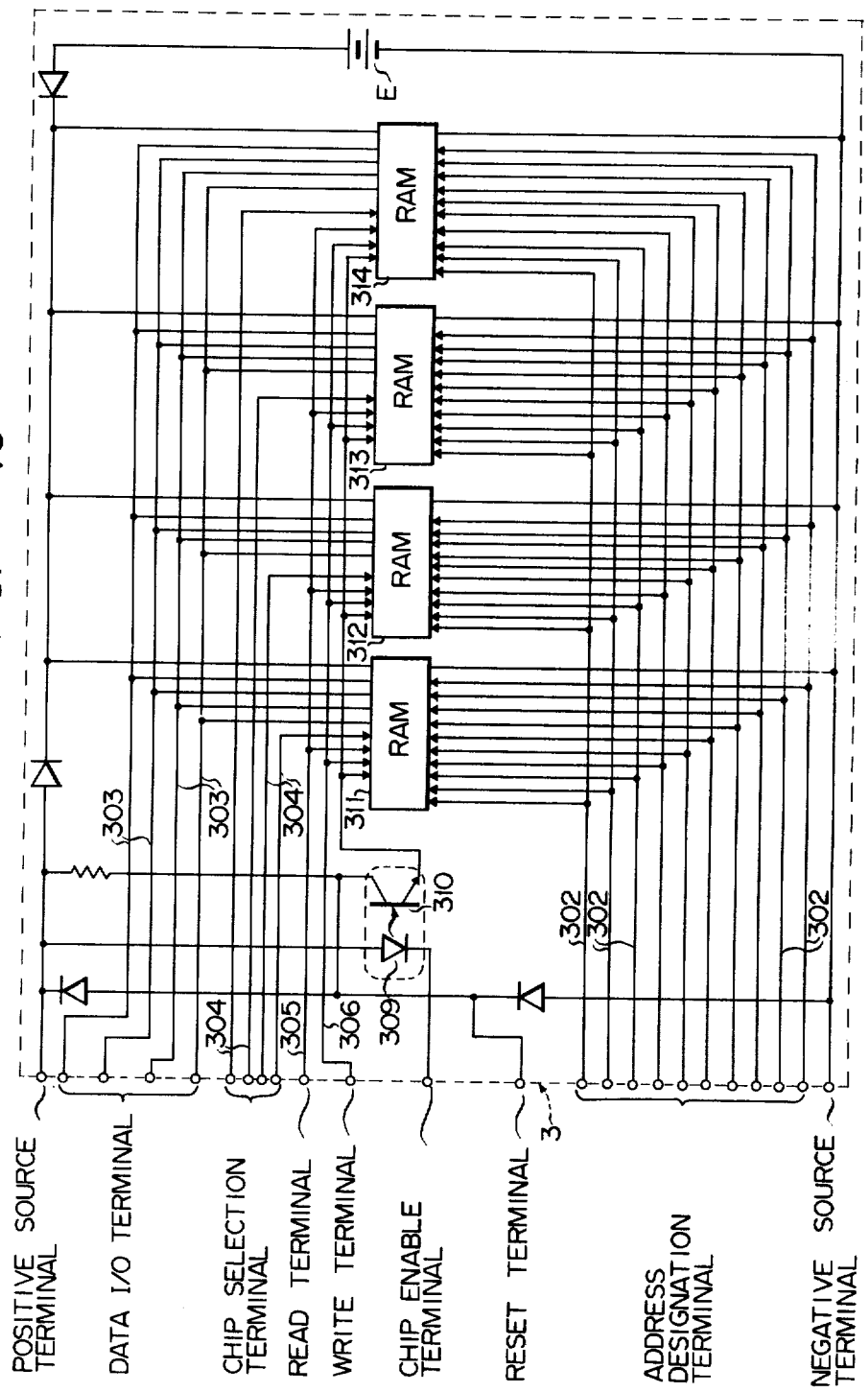

FIG. 10 shows a circuit diagram of the terminal memory pack 3. The circuit uses four RAMs 311 to 314 which are substantially the same as the cashier memory pack 4 shown in FIG. 9, except that four chip selection lines 304 for selecting these RAMs are coupled with the output terminals "0", "1", "2", and "3" of the interface 223.

There will now be described the construction of the cashier register 1 shown in FIG. 1.

Figure 11:
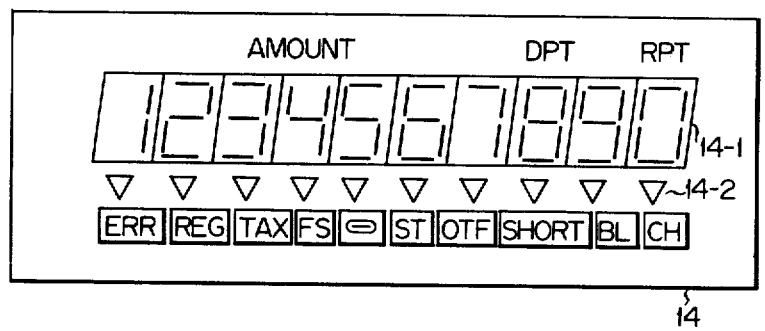
FIGS. 11 and 12 show the front views of a display and keyboard of the electronic cash register shown in FIG. 1.

FIG. 11 shows a display section 14 used in ECR 1. The display section 14 is provided with a display unit 14-1 of ten digits. The upper six digits of the display unit 14-1 is used to display amount of money and the lower four digits thereof are used for the department and a repeat display. Incidentally, the display section 14 is provided with a plurality of display lamps 14-2 for indicating various operation modes.

Figure 12:
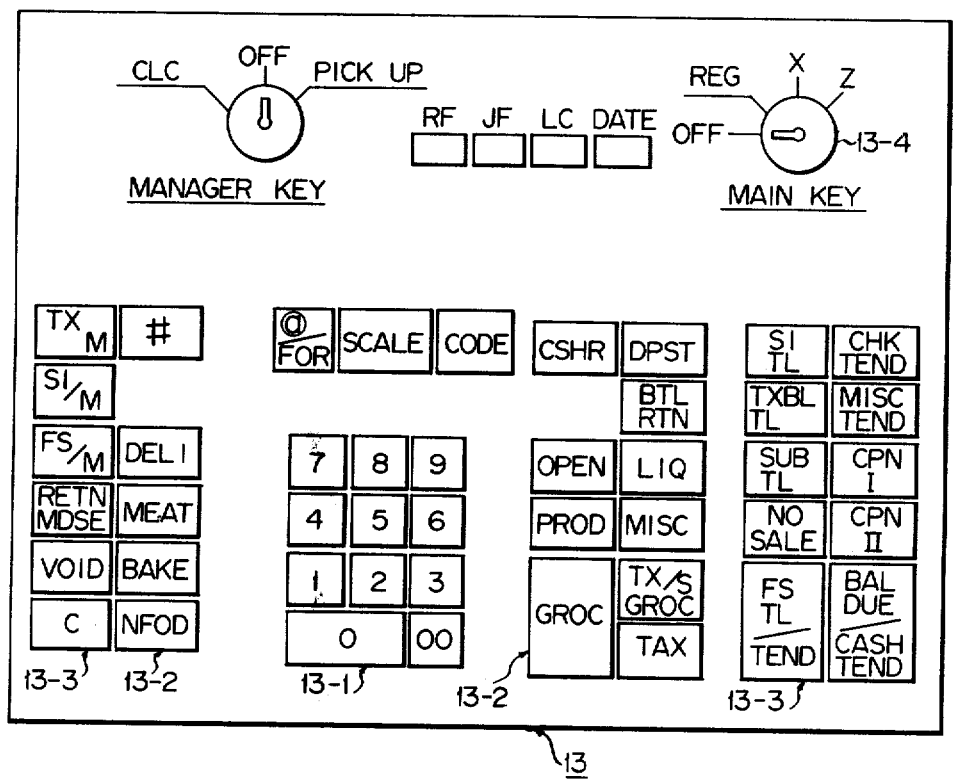

FIG. 12 shows the detail of the keyboard 13 of the ECR 1. The keyboard 13, as is well known, includes eleven entry keys 13-1 operated to enter numerals "00", "0" to "9", a department key 13-2 for registering sold items for each department, a function key 13-3 for registering the contents of transaction, and a main key 13-4 for setting up a registering operation mode and the like.

Figure 13:
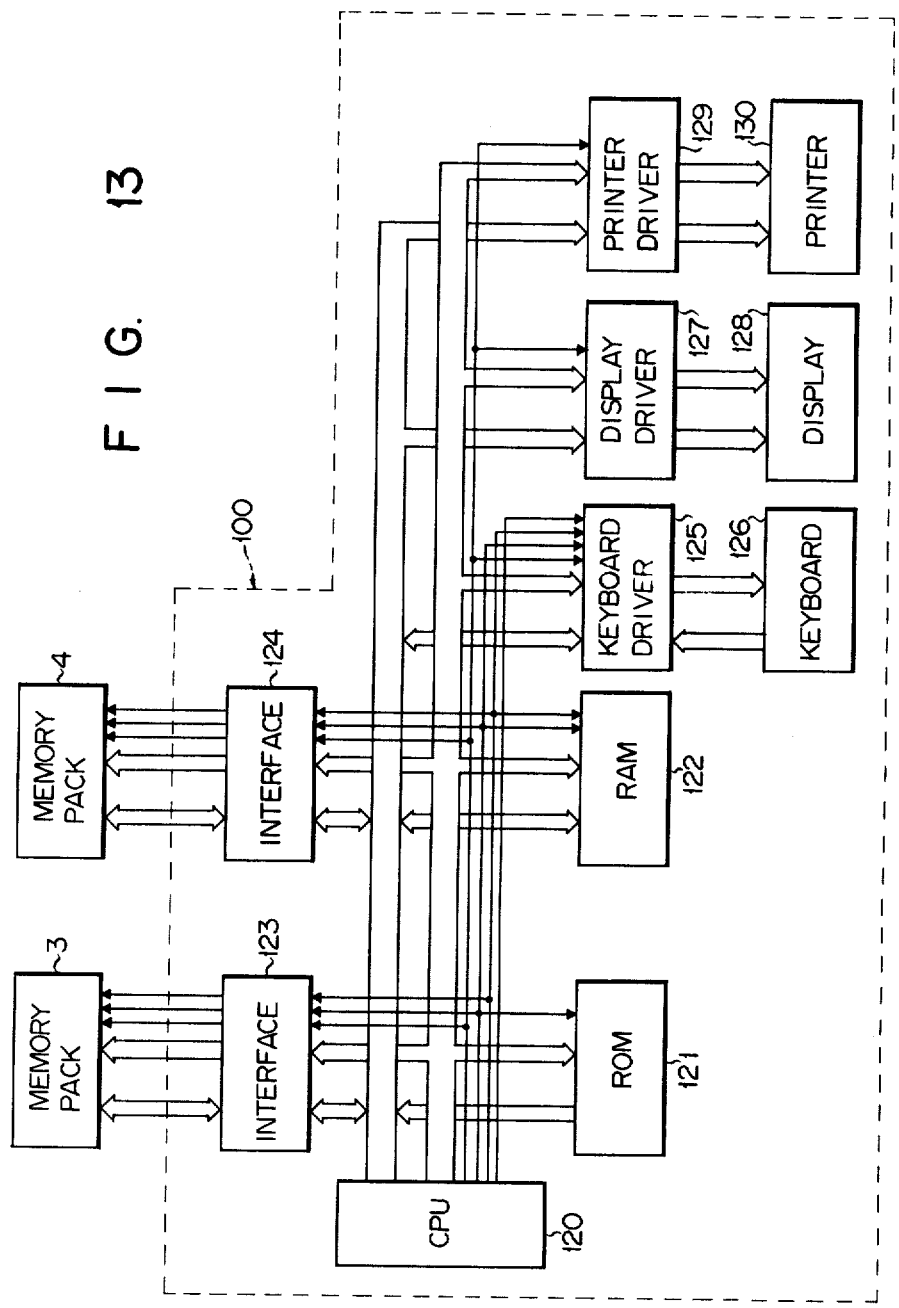
FIG. 13 shows a circuit diagram of the electronic cash register shown in FIG. 1.

FIG. 13 shows an electronic circuit 100 of the ECR 1 and the cashier and terminal memory packs 4 and 3 shown in FIGS. 9 and 10 coupled with the electronic circuit 100. The electronic circuit 100 includes a central processing unit (CPU) 120, a read only memory (ROM) 121, a random access memory (RAM) 122, a terminal memory pack interface 123 for electrically coupling the terminal memory pack interface 123 with the CPU, and a cashier memory pack interface 124 for electrically coupling the cashier memory pack 4 with the CPU 120. The CPU 120 is connected to a keyboard circuit 126 through a keyboard drive circuit 125 to be described later, to a display circuit 128 through a display drive circuit 127 and to a printer circuit 130 through a printer drive circuit 129.

Figure 14:
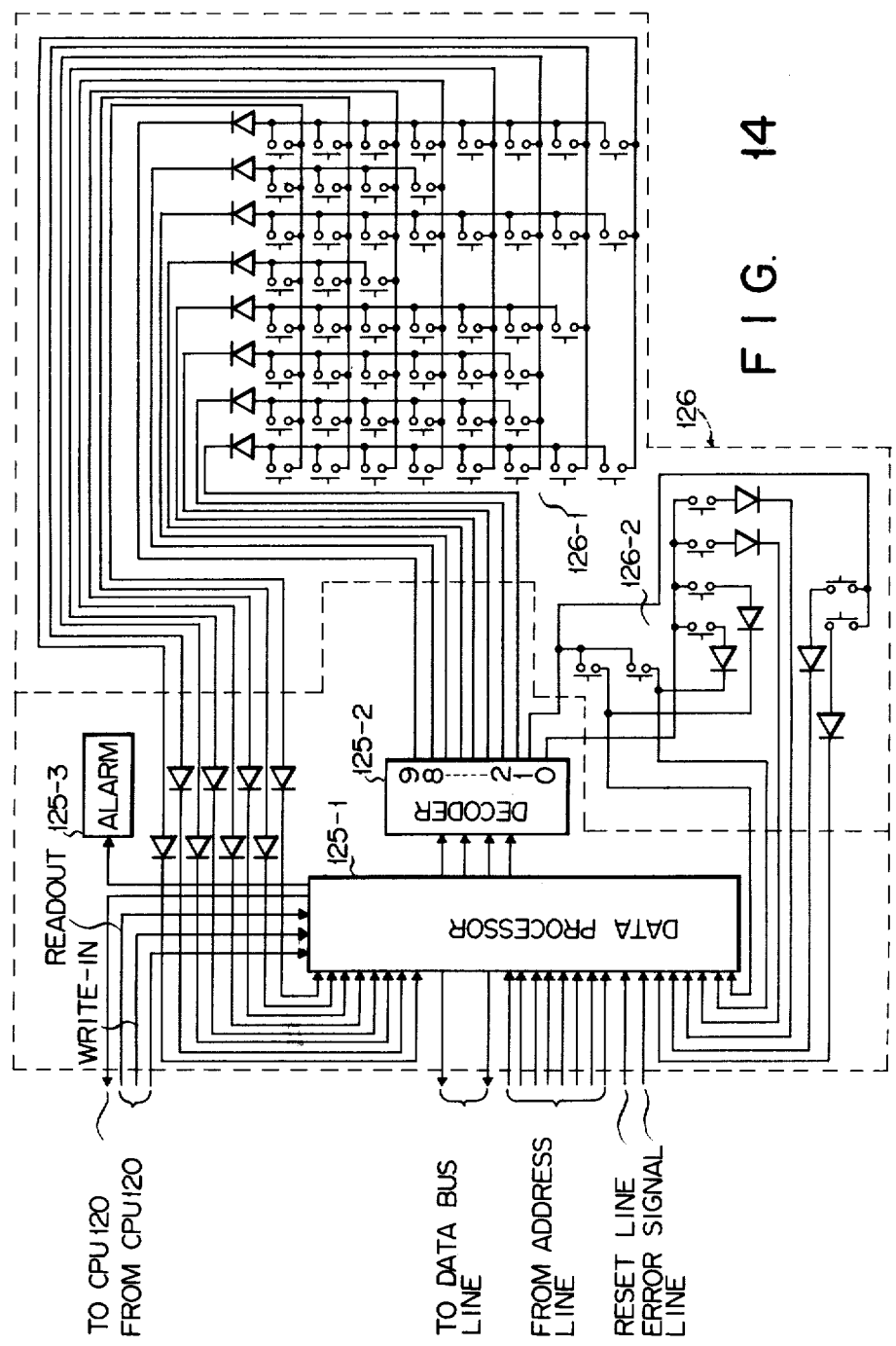
FIG. 14 shows a circuit diagram of the keyboard drive circuit and keyboard circuit shown in FIG. 13.

FIG. 14 shows a circuit diagram for illustrating the details of the keyboard drive circuit 125 and the keyboard circuit 126. This circuit is principally equal to the circuit shown in FIG. 7. The data processing circuit 125 has functions of the address coincidence circuit 239-1, the AND gates 239-2 and 239-3 and part of the CPU 220, and this circuit is formed of a large scale integrated circuit such as an INTEL 8279 sold by INTEL company in U.S.A. The decoder 125-2, responsive to an address signal from the data processing circuit 125-1, successively and repeatedly produces output pulses from the output terminals "0" to "9". The keyboard circuit 126 is constituted by a key matrix 126-1 having a plurality of keys including entry keys, department keys, function keys and the like and a key array 126-2 including a plurality of keys corresponding to the control keys. When one of the keys of the key matrix 126-1 is operated, the key operation is detected by one of the output pulses from the decoder 125-2 and the information relating to the key operation is sent to the data processing circuit 125-1. The data processing circuit 125-1, upon receipt of the information relating to the key operation, supplies the key information corresponding to the input information to the CPU 120 through the data bus and delivers a signal indicating the key operation to the CPU 120 through a key operation detection line. When one of the keys on the key array 126-2 is operated, the key operation is detected by an output pulse from the decoder 125-2 and information relating to the key operation is applied to the CPU through a data bus and at the same time a key operation detection signal from the data processing circuit 125-1 is applied to the CPU 120 through the key operation detection line.

In this manner, the circuit shown in FIG. 14 transfers the information corresponding to the key operated to the CPU 120, as in the case of FIG. 7.

Figure 15:
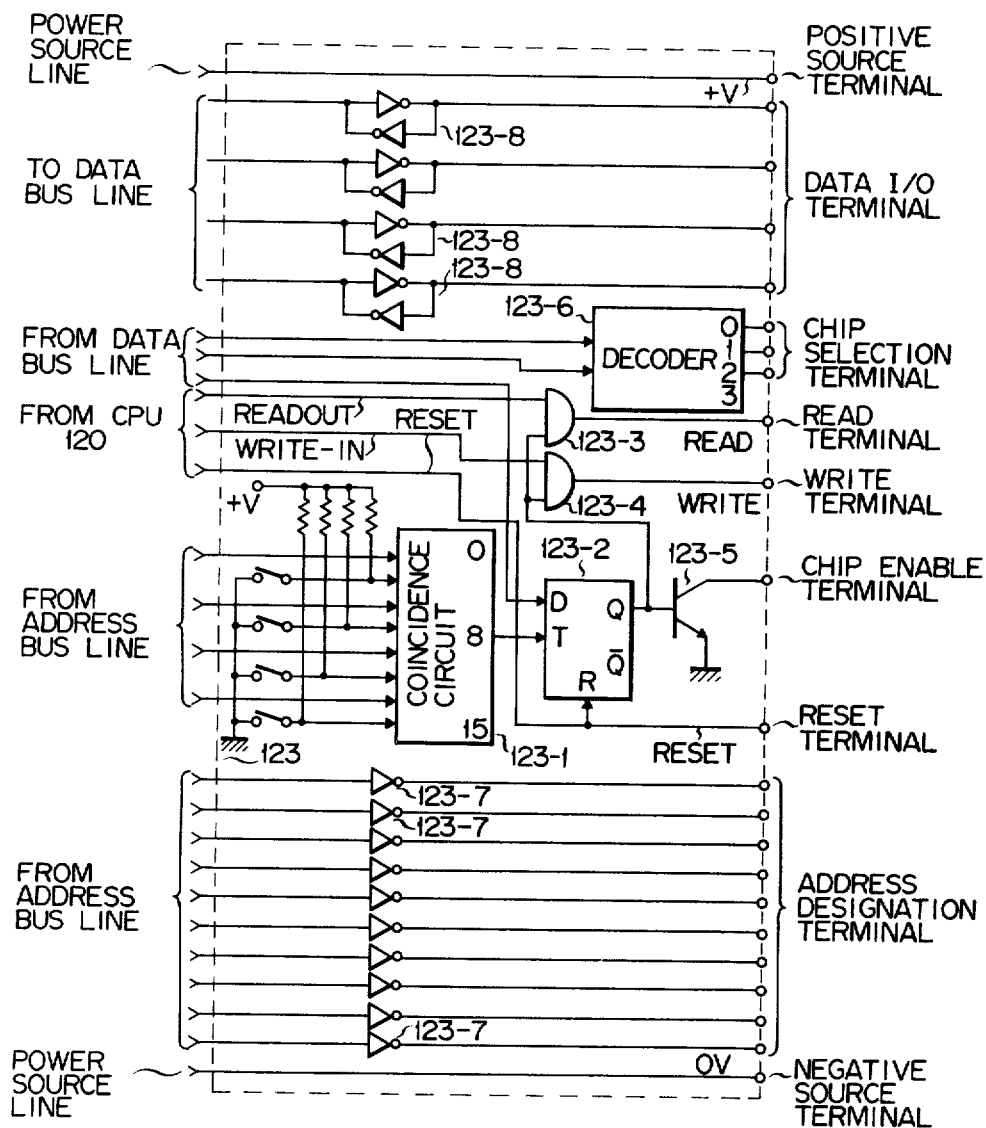
FIG. 15 shows a circuit diagram of the interface circuit shown in FIG. 13.

FIG. 15 shows a circuit of the terminal interface 123. The interface circuit 123 is similar in construction and operation to the interface 223 of the SDP 2 shown in FIG. 8. In the terminal interface 123 shown in FIG. 15, like reference numerals designate like circuits in FIG. 8. As a matter of course, the coincidence detection circuit 123-1 may be designed so as to assign a specified code to the address coincidence circuit 123-1. The cashier interface 124 may be designed like the FIG. 15 interface 123 except that the code of the coincidence detection circuit is made different. In the cashier interface 124, the decoder 123-6 may be omitted.

The operation of the ECR 1 and the SDP 2 will be given below.

Figure 16A:
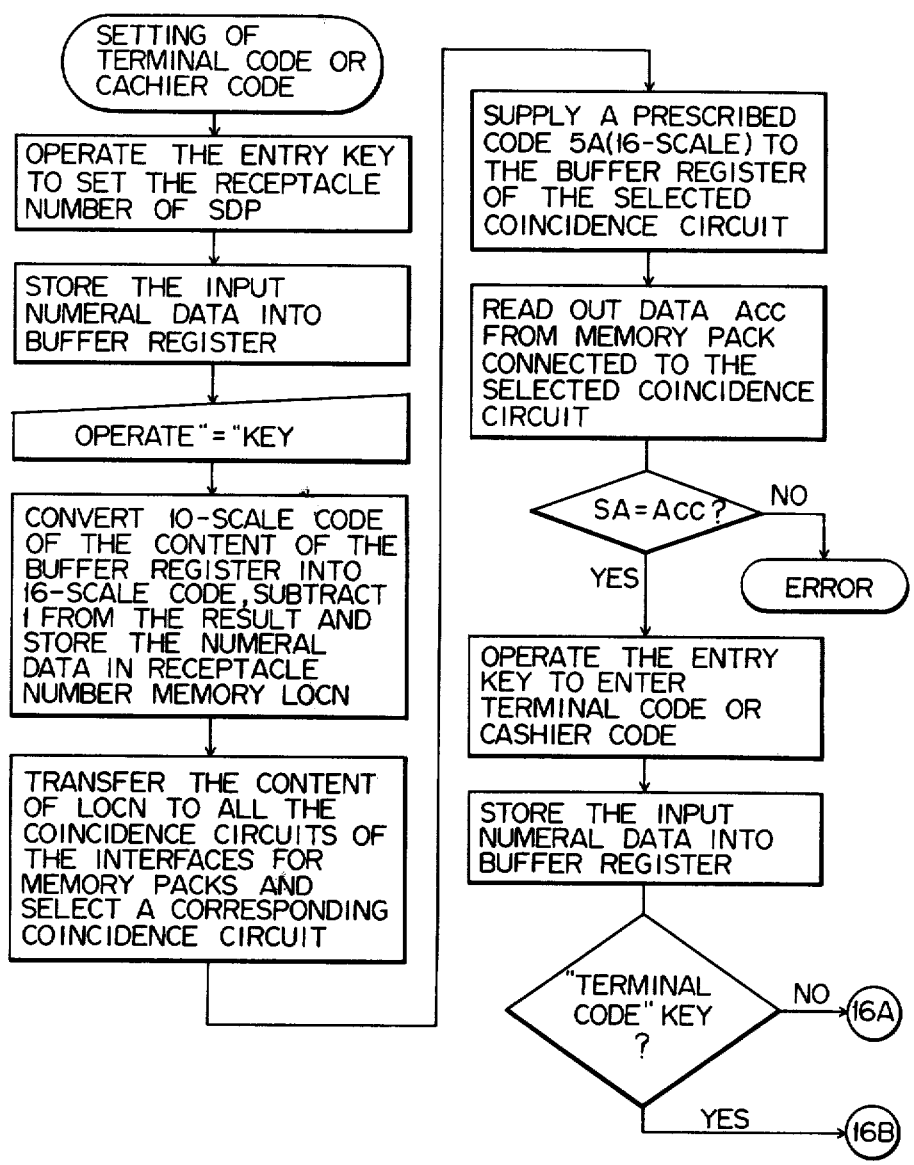
FIGS. 16A and 16B show a flow chart for process to give a specific code to the terminal memory pack or the cashier memory pack.
Figure 16B:
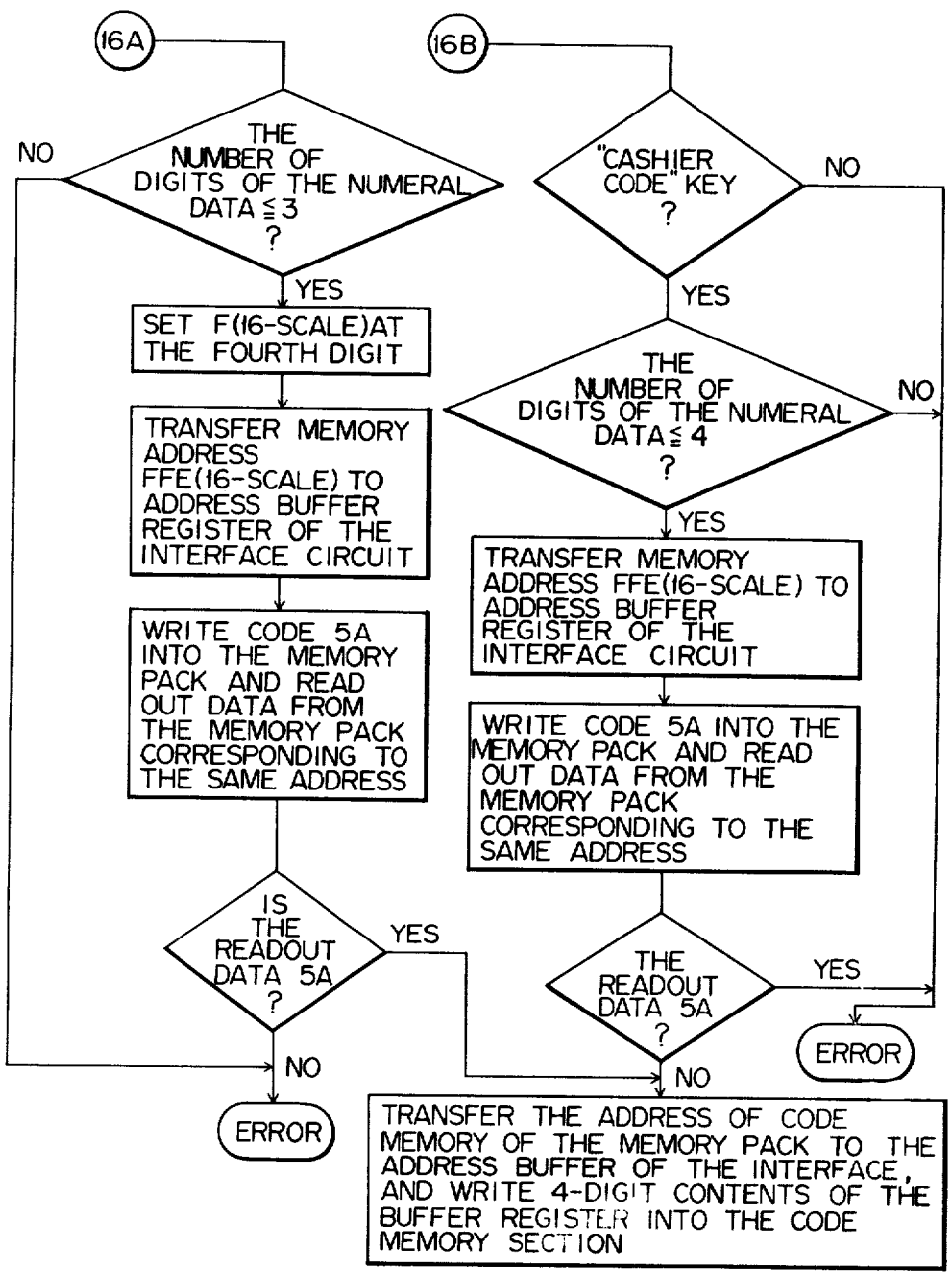

A given number of terminal memory packs 3 to be first used are loaded into the receptacles of the memory pack receiving section 20 of the SDP 2. In order to write a terminal code into one of the terminal memory packs 3, the numeral information corresponding to the specified code of one of the address coincidence circuits 223 in the memory pack interfaces 223 to 238 (FIG. 6) is transferred to the coincidence detection circuit 223-1 by operating the entry key 21-1 (FIG. 5). Then, an "=" key in the function keys 12-2 is operated so that a signal is delivered to the D input terminal of the flip-flop circuit 223-2 and the flip-flop circuit 223-2, responsive to the signal, produces a high level signal at the Q terminal. As a result, a given RAM, for example, RAM 311, in the terminal memory pack 3 is energized. The numeral information representing a desired terminal code is loaded into the RAM 311 by operating the entry key 21-1 and the terminal code key 21-4. The same operation will be performed when the terminal code is stored into another terminal memory pack. FIGS. 16A and 16B show a flow chart for illustrating a process for setting up terminal code or cashier code.

Figure 18:
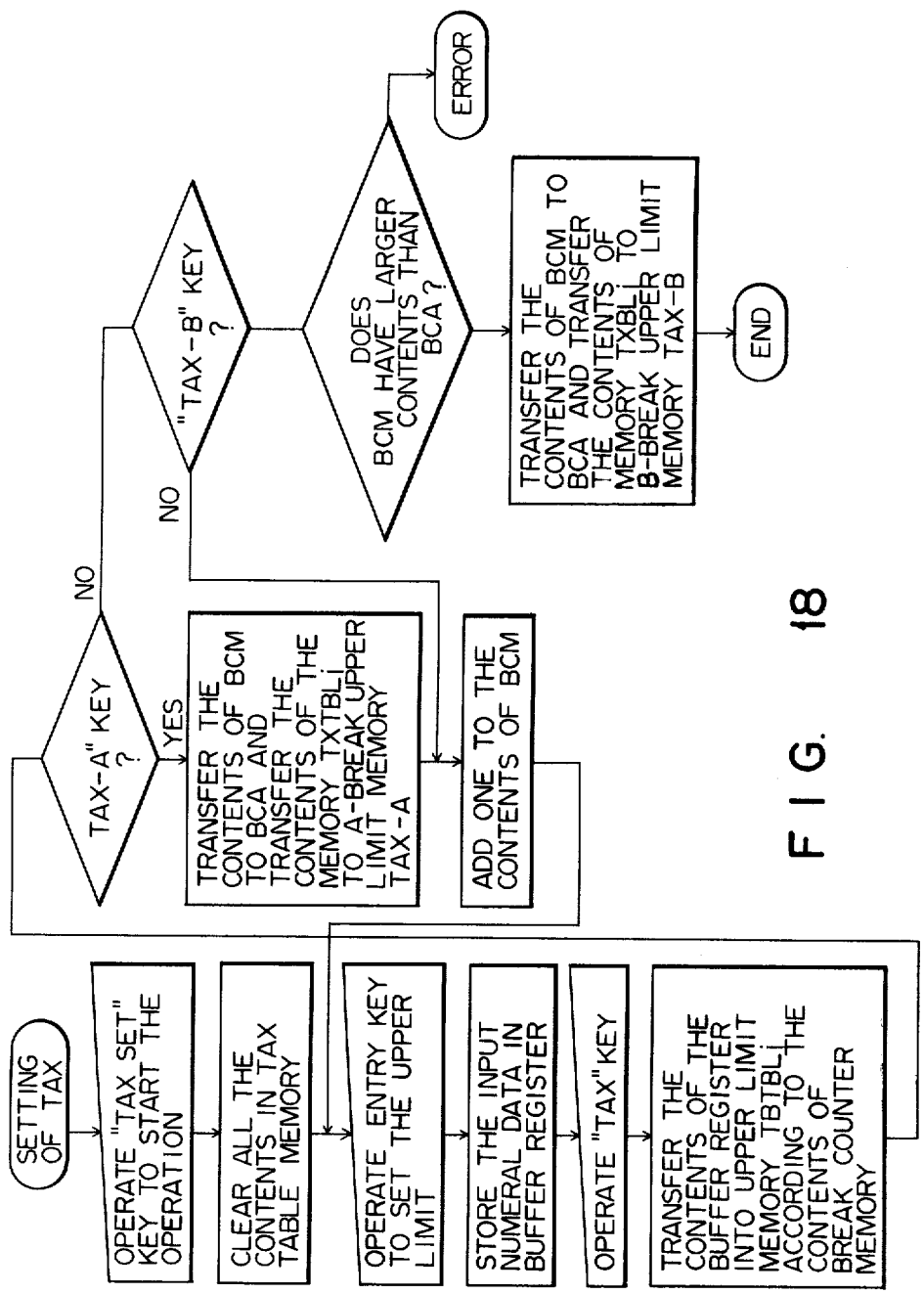
FIG. 18 shows a flow chart to illustrate a process for writing tax information into the terminal memory pack.

Inherent terminal codes are recorded onto the respective terminal memory packs, and desired information is loaded into the terminal memory pack. The information loading operation is similar to the case where, in a conventional ECR, desired information is loaded into the RAM of the register. Here, let us consider the case of loading tax information, as shown in the flow chart in FIG. 18.

Figure 17A:
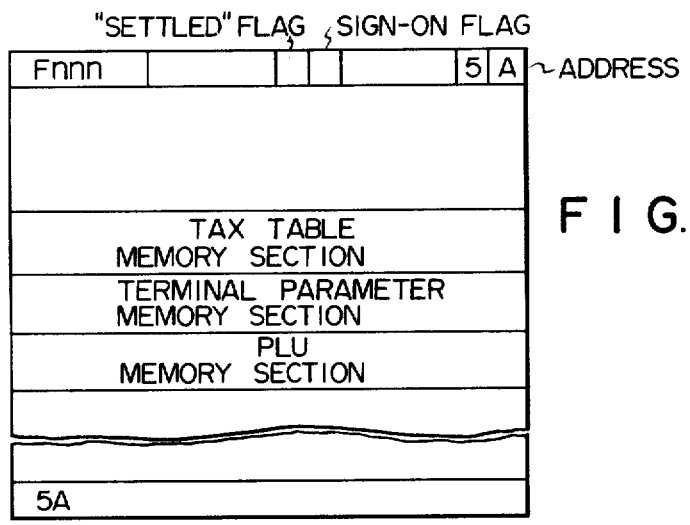
FIGS. 17A and 17B respectively illustrate memory areas of the terminal and cashier memories.

A "TAX SET" key in the function keys 21-2 is first operated to set up the state for writing tax information into the ECR. After operation of the entry key 21-1, the upper limit of a tax imposed on article is loaded into the first upper limit value memory of the tax memory area of the RAM 222 as shown in FIG. 17A by operating the "TAX" key. Then, if the "TAX-A" key is operated, the contents of the first upper limit memory are transferred to the TAX-A memory and, if the TAX-B key is operated, the contents are transferred to the TAX-B memory. Similar operations will be repeated so that the tax table is completely written into the RAM 222 of the SDP. In this manner, various data as shown in FIG. 17A are loaded into the terminal memory pack.

Then, the PLU MOVE key of the function key 21-2 is operated so that the CPU 220 successively and selectively energizes the interfaces 223 to 238 thereby to allow the contents of the RAM 222 to be loaded into proper locations of the RAM 311 to 314 of the terminal memory packs.

As described above, desired information is loaded into the RAM of the SDP2 in a similar procedure of the conventional ECR and the information is loaded into a plurality of terminal memory packs substantially at the same time. Then, these terminal memory packs are inserted into the memory pack receptacles of the ECRs 1. Accordingly, the same information may be loaded into the memory sections of these ECRs 1. In this respect, the invention highly improves over the conventional ECRs in the loading of the same information.

Figure 17B:
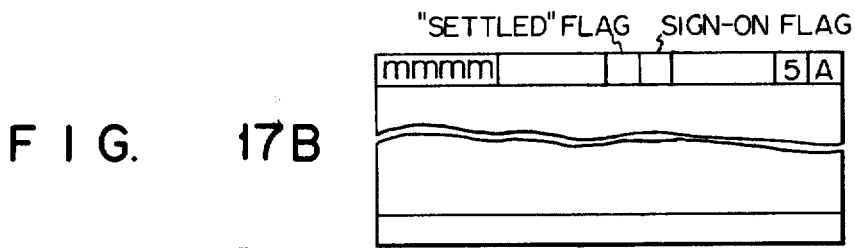
Figure 19:
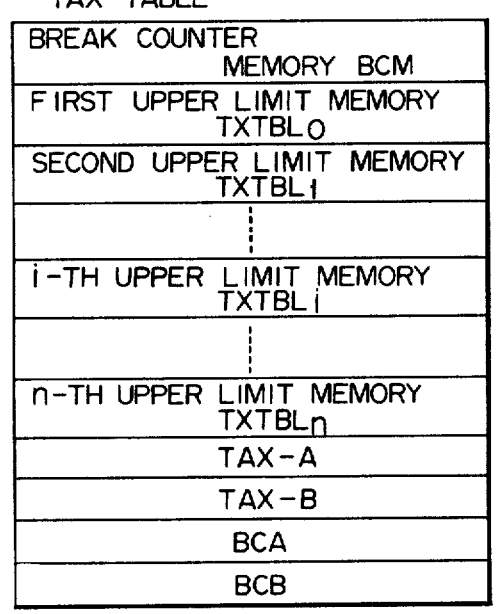
FIG. 19 shows one of the tax tables loaded into the terminal memory pack in the process in FIG. 18.

The recording procedure of the cashier code onto the cashier memory packs 4 is the same as that of the terminal code, except that the cashier code key is operated in place of the terminal code key. Loaded into the cashier memory pack are various data including those shown in FIG. 17B, for example.

In the embodiment, terminal memory packs into which terminal codes SIGN-ON flags, desired information and the like are entered in the above manner and the cashier memory packs having cashier codes, SIGN-ON flags and the like thus stored are inserted into the memory pack receptacles 11 and 12, respectively. Then, the main key 13-4 is set to the "REGISTER" position and the entry key 13-1 is operated to load the cashier code of the cashier memory pack 4 into the RAM 122 of the ECR 1. Following this, the "CSHR" key is operated. Upon the operation of the "CSHR" key, the CPU 120 compares the cashier code recorded by key operation with the cashier code stored in the cashier memory pack 4 and compares the terminal code stored in the RAM of the ECR 1 with the terminal code stored in the terminal memory pack. When the terminal and cashier codes are coincident and a SIGN-ON flag is generated, the ECR 1 is set operable as an ordinary ECR operates. On the other hand, when any one of the codes is not coincident or SIGN-ON flag is not generated, the CPU 120 issues an error signal to drive an alarm 125-3. When the terminal memory pack or the cashier memory pack is removed from the receptacle, the CPU 120 detects this condition and issues a clear signal to the memory section of the RAM 122 storing the cashier code to clear the cashier code from the RAM 122.

After the terminal memory pack and the cashier memory pack are properly set in the receptacles the ECR 1 may perform its registering operation as an ordinary electronic cash register does. As in FIG. 20, the main key 13-4 is first set at "REG" position and then the entry key 13-1 is operated to register an amount of sold items into the ECR 1. At the next step, the department key 13-2 is depressed to register the department of sold items. Through operations of respective entry keys 13-1 and the department key 13-2 according to individual items, the registration work is executed so that the registration contents are commonly loaded into the terminal memory packs 3 and the cashier memory packs 4. Additionally, loaded into the terminal memory packs 3 are the sales total data for each department and each transaction. The registering operation for this is well known as disclosed in U.S. Ser. Nos. 799,987 and 800,943, now U.S. Pat. Nos. 4,142,235 and 4,144,567, respectively.

Figure 20A:
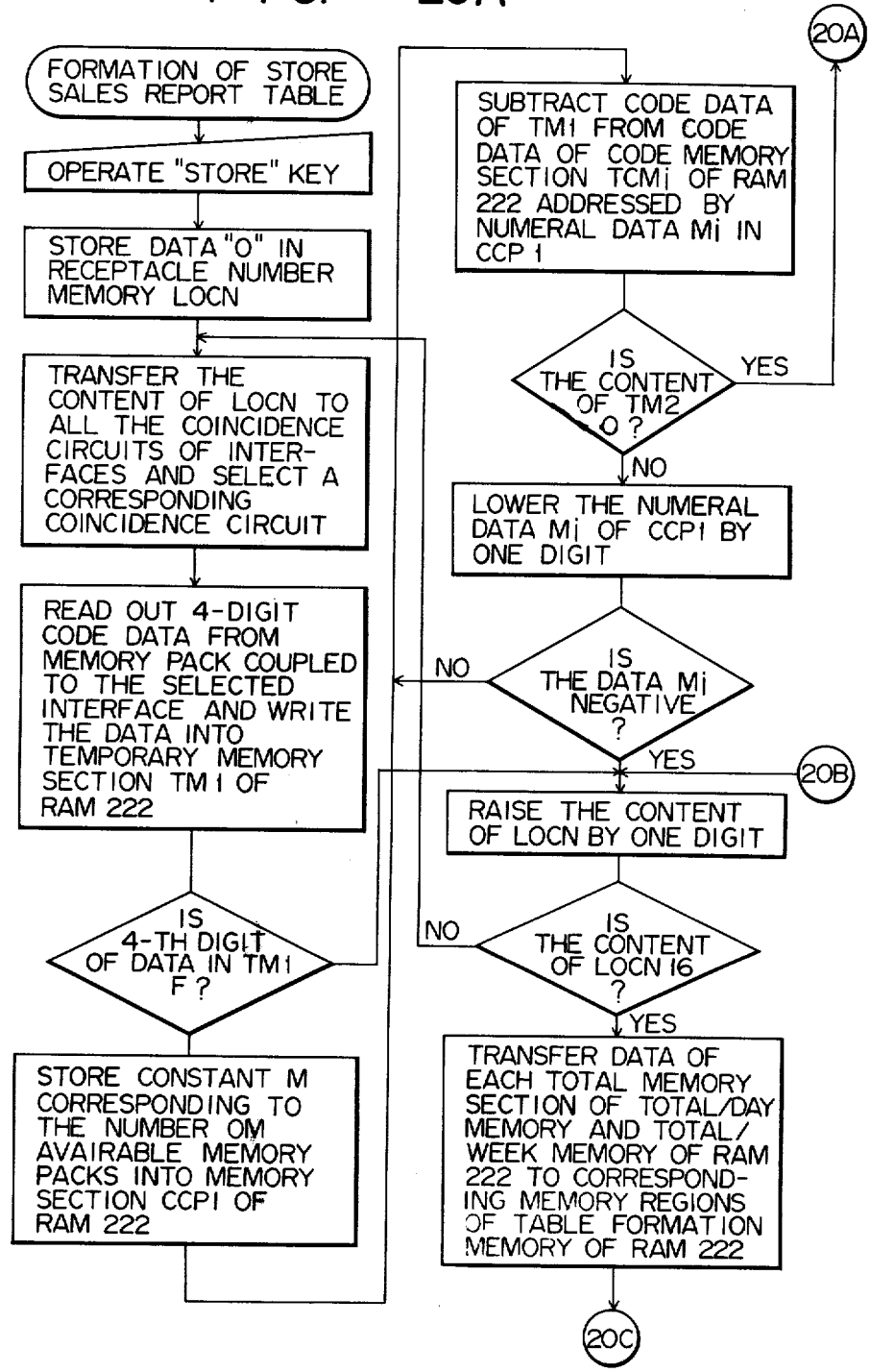
Figures 20C, 26:
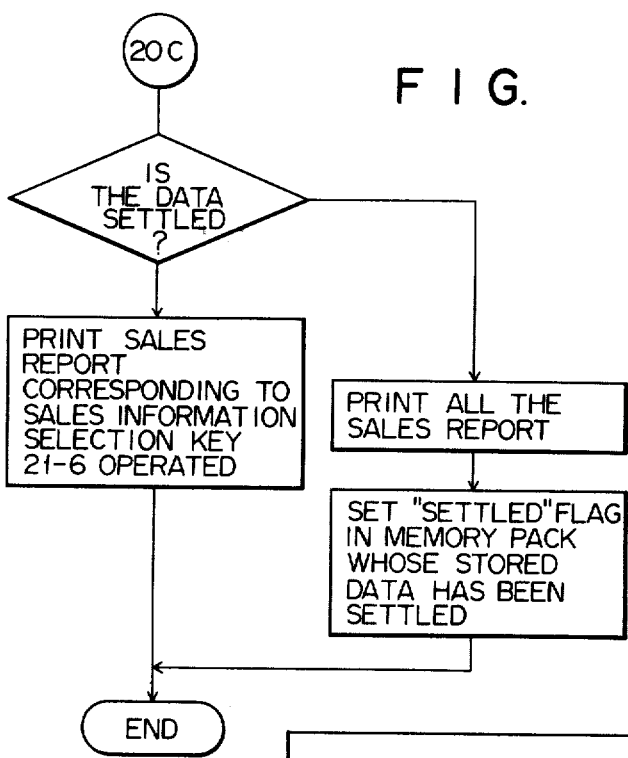

By using the terminal memory pack 3 and the cashier memory pack 4 storing the sales information, a store sales report and a cashier sales report are prepared. FIGS. 20A-20C show a flow chart for preparing the store sales report. The terminal memory packs 3 storing the sales information are inserted into the receptables 20-1 to 20-16 of the SDP2 and the "STORE" key in the report preparing keys 21-3 operated. Responsive to the operation of the STORE key, the CPU 220 detects that a flag is generated in the SIGN-ON memory area of the terminal memory pack, permits data "0" to be written into the receptacle number memory LOCN occupying a part of the RAM 222, supplies the contents of the LOCN to the coincidence detection circuits of all the interfaces 223 to 238, and selects the interface having the corresponding code, for example, the interface 223. Then, the CPU 220 reads out the terminal code of the terminal memory pack coupled with the interface 223. Thus, the preparation work for the store sales report is completed.

Then, the CPU 220 successively transfers the sales information stored in the terminal memory pack for each transaction such as cash or check transaction and for each department to the RAM 222. When the reading operation of the sales information from the terminal memory pack is completed, the CPU 220 stores "1" signal into the memory LOCN, selects, in accordance with the contents of the memory LOCN, the next interface, for example, the interface 224, reads out the sales information from the terminal memory pack coupled with the interface 224 as in the previous case, adds the readout sales information to the sales information stored in the corresponding memory area of the RAM 222, and loads the result of the addition into the corresponding memory area of the RAM 222. Upon completion of the transfer of the sales information into the terminal memory pack, the gross sales for a day are loaded for each transaction and for each department into the store report memory area of RAM 222 as shown in FIG. 22, and then a store sales report for each transaction, for example, is prepared as shown in FIG. 22. For preparing a reset report, the control key 21-7 is first set at "RESET & REPORT" and then a "STORE" key is depressed. In this case, a "Reset complete" flag is generated in the memory pack in which the reset report preparation is completed and the information stored is sustained without any change.

Figure 23A:
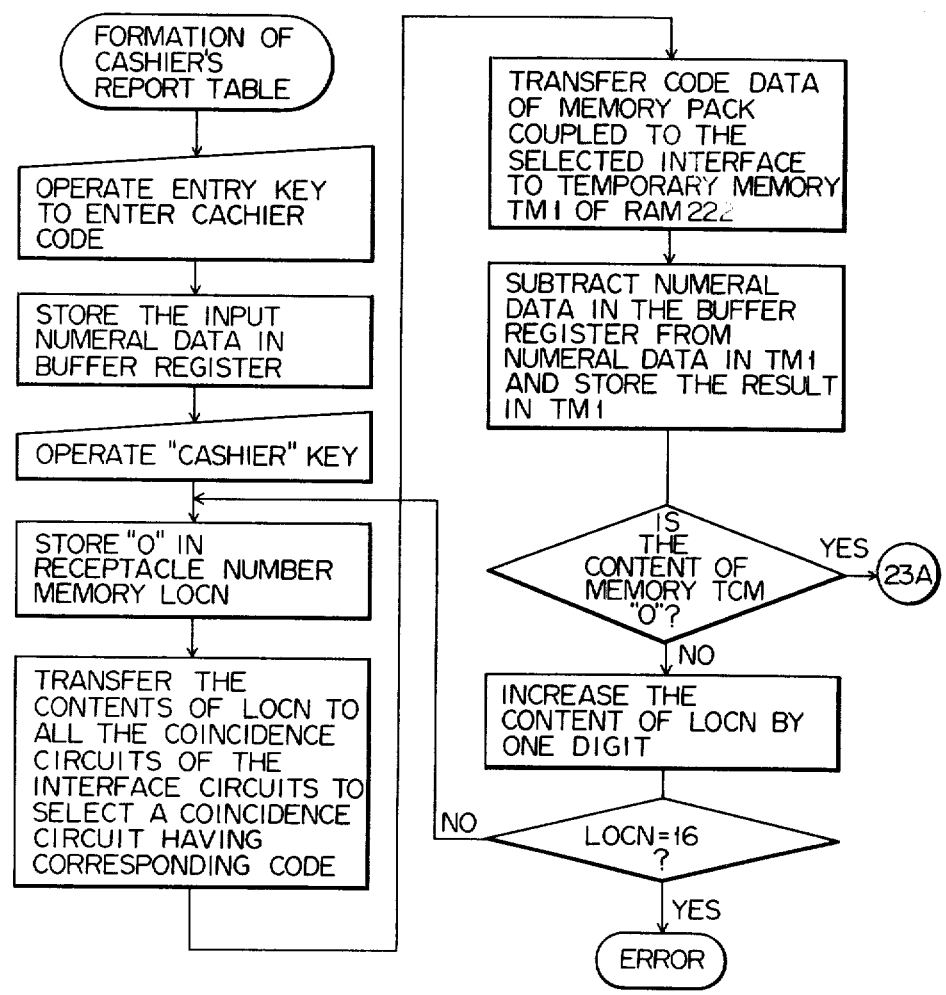
FIGS. 23A and 23B show a flow chart for preparing a cash sales report.
Figure 23B:
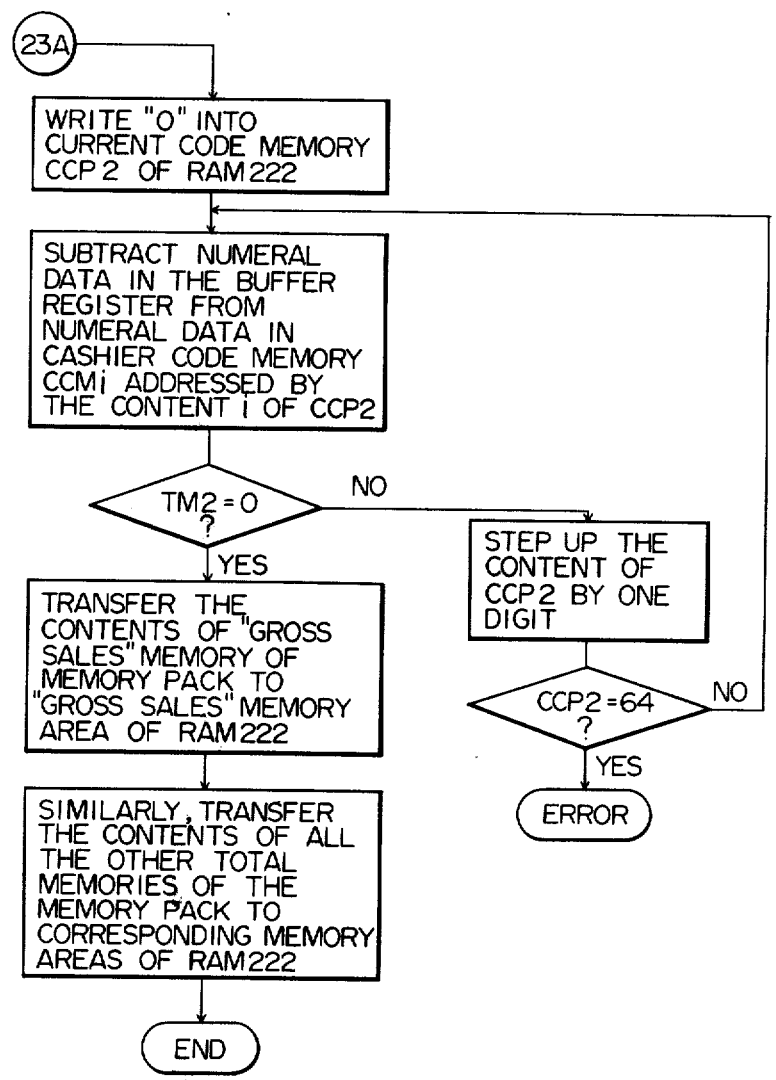

FIGS. 23A and 23B show a flow chart for illustrating the procedure to make out a cashier sales report. Cashier memory packs storing the sales information are inserted into the receptacles 20-1 to 20-16. After insertion, an entry key 21-1 is operated and the cashier code of the cashier memory pack is entered into the cashier code memory area of the RAM 222. Then, a CASHIER key of the report preparation keys 21-3 is operated, with the result that the CPU 220 successively transfer data signals "0" to "15" into the receptacle number memory location LOCN in the RAM 222 and at the same time feeds the respective data signals into all the interfaces 223 to 238 to detect the interface coupled with the cashier memory pack.

Then, the CPU 220 successively transfers the sales amount information stored for each transaction from the cashier memory pack to the RAM 222. In this way, the sales amount information stored for each transaction is transferred to a given memory area of the RAM 222. As a consequence, a cashier sales report is formed as shown in FIG. 24.

Figure 25:
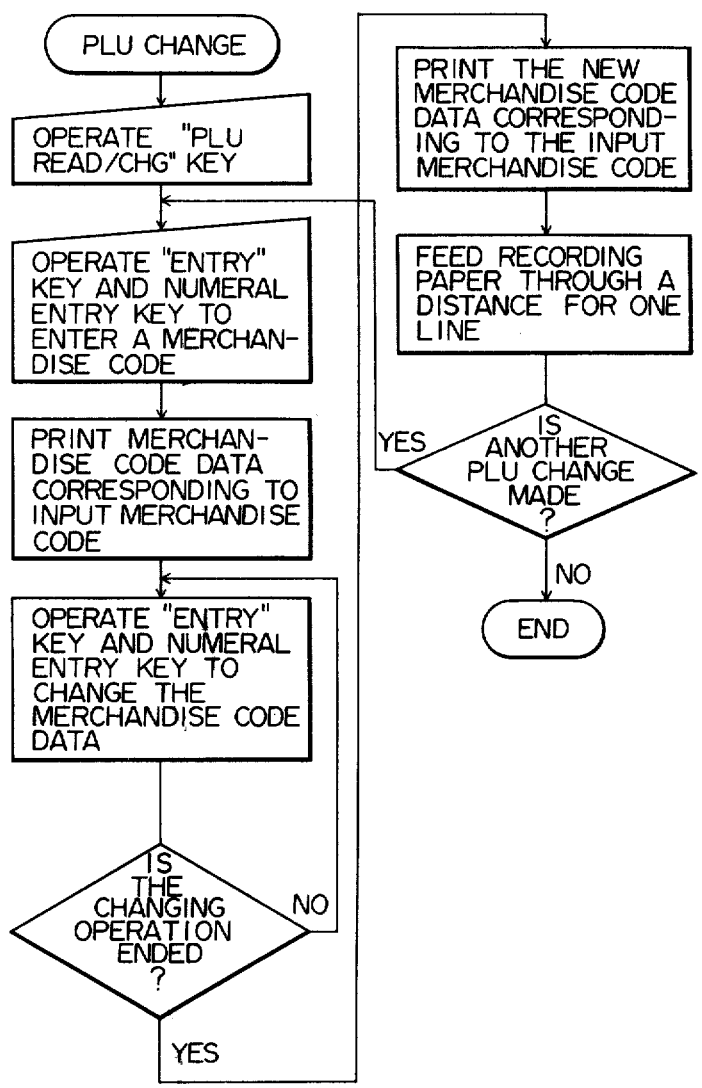
FIG. 25 shows a flow chart illustrating a procedure to change the item code information.

A procedure for changing the item code information will be given with reference to FIG. 25.

A "PLU READ/CHG" key of the PLU key 21-7 is depressed and then the entry key 21-2 and the ENTRY key are operated to enter the item code. Upon operation of the entry key and the "ENTRY" key, the CPU 220 reads out the item code information corresponding to the item code from the RAM 222 and then applies it to the print drive circuit 243. The printer circuit 244 receives an output signal from the printer drive circuit 243 and prints the item code information, e.g. the item code information "98 5 TX" corresponding to the code "123" in FIG. 15. Here, the first numerical information "98" indicates a price ¢ 98. The middle numeral "5" indicates a department, for example, one of ten departments such as meat and vegetables. The last symbol "TX" indicates a taxation article. When it is desired to correct the price section of the item code information, the entry key and the "ENTRY" key are operated to register the corresponding price. When there is no need of the price change, the "SKIP" key in the PLU key 21-7 is depressed. After this, if there occurs a need of the department change, for example, the entry key and "ENTRY" key are depressed to enter a new department. When there is no change of department, the "SKIP" key is depressed. Further, when there is a change of the indicating part of the taxation article, the entry key "1" is depressed to indicate that it is a taxation article, or the entry key "0" is depressed to indicate that it is not a taxation article and then the "ENTRY" key is operated. In this case, if there is no change of the indicating part of the taxation article, the "SKIP" key is operated. Further, when an exchange is paid to the item, the entry key "1" is depressed. On the other hand, when cash is used for it, the entry key "0" is depressed, and then the "ENTRY" key is operated. For example, when the price information "98 5 TX" is changed into another information "98 5 FS", the respective keys are operated in the following manner. That is, after the "SKIP" key is depressed two times, the entry key "0", the "ENTRY" key, and the entry key "1" are depressed in this order.

The contents thus changed are printed below and together with the item code information before being changed as shown in FIG. 15. After the new item code information is printed, the CPU 220 applies a feed signal to the feed terminal of the printer drive circuit 243 to feed a recording paper by one line without any printing operation. Accordingly, the article code information to be next changed is printed with a space by one line from the new item code information printed immediately before. Through the key operation, the change of the item code information is completed, and finally the "END" key is depressed. Also in the case where the "FEED" key on the keyboard 21 is operated, the CPU 220 feeds a feed signal to the feed terminal of the printer drive circuit 243 so that the recording paper is fed by the distance corresponding to the duration of the FEED key operation.

While the invention has been described by using a specific embodiment, it is not limited to such an example. For example, to prepare the store sales report, in the above example, the sales information selection key 21-6 is operated and then the STORE key is operated. However, the store sales report may be prepared in the reverse key operation procedure. In the above example, information change is performed by the SDP 2. Unlike the conventional case using the memory pack, however, the invention is applicable for the electronic cash register in which transaction information is stored in the RAM included therein.

What is claimed is:

1. A data processing apparatus for an electronic cash register comprising:
   a keyboard including a plurality of entry keys, a store key and a plurality of keys for sales information selection;
   printing means;
   memory means;

at least one memory pack for storing sales information;

at least one interface circuit with which said memory pack for storing sales information is mechanically, electrically and removably coupled; and a data processing unit coupled to said keyboard, printing means and memory means, and being responsive to the operation of at least one of the sales information selection keys and said store key of said keyboard to energize said memory pack, and to read out the sales information corresponding to the operated sales information key and write the readout sales information into said memory means and to then apply a command signal to said printing means to cause said printing means to print said sales information stored in said memory means.

2. A data processing apparatus according to claim 1, in which said keyboard includes a control switch operative to a first position and a second position; and said data processing unit, when said control switch is set to the first position, is responsive to the operation of said store key to write all the sales information in the memory pack coupled with said interface circuit into said memory means and, when said control switch is set to the second position, is responsive to the operations of at least one sales information selection key and said store key to energize the memory pack coupled with said interface circuit, and to read out the sales information corresponding to the sales information selection key operated and write the readout sales information into said memory means.

3. A data processing apparatus according to claim 1, in which said sales information selection keys includes a transaction key, a time zone key and a department key.

4. A data processing apparatus according to claim 1, in which said keyboard further includes an information change initiation key and a changed information entry key; and said data processing unit is responsive to the operations of said information change initiation key, at least one of said plurality of entry keys and the changed information entry key to read out first information stored in said memory means corresponding to the code information entered by the operation of said at least one of said plurality of entry keys to permit the information read out to be printed onto a recording paper by said printing means, and is then responsive to the operations of said at least one of said plurality of entry keys and said changed information entry key to write second information corresponding to said at least one of said plurality of entry keys operated into said memory means and at the same time drive said printing means to print on the recording paper the first and second information in parallel fashion.

5. A data processing apparatus according to claim 4, further comprising a recording paper feeding mechanism coupled to said data processing unit and to said printing means for feeding the recording paper without any printing operation in response to an output signal from said data processing unit after the first and second information are printed.

6. An electronic cash register system comprising:

a plurality of memory packs;

a plurality of electronic cash registers each having a first keyboard including a plurality of entry keys, at least one function key, and at least one department key; first memory means; a first interface circuit with which at least one of said memory packs is mechanically, electrically and removably coupled; and a first data processing unit coupled with said first keyboard, said first memory means and said first interface circuit which writes information generated by the key operation on said first keyboard into said memory means and also into said at least one memory pack coupled with said first interface circuit;

a data processing apparatus having a second keyboard including a plurality of second entry keys, at least one second function key, a store key, and a plurality of sales information selection keys; printing means; second memory means; a plurality of second interface circuits with which at least one of said memory packs is mechanically, electrically and removably coupled; and a data processing unit connected with said second keyboard, said printing means, said second memory means and said second interface circuits, said data processing units writing information generated by the operations of said second entry keys and said at least one second function key into said at least one memory pack coupled with said second interface circuits and said second memory means and at the same time being responsive to the operations of at least one of said sales information selection keys and said store key to successively energize said at least one memory pack coupled with said second interface circuits to thereby read out the sales information corresponding to the sales information key operated from the at least one energized memory pack and write the readout sales information into said second memory means and finally to apply a print command signal to said printing means to cause the sales information stored in said second memory means to be printed by said printing means.

* * * * *